Patented July 28, 1953

2,647,131

UNITED STATES PATENT OFFICE 2,647,131

METHOD OF MANUFACTURE OF BIOLOGICALLY ACTIVE COUMARINE AND PRODUCT THEREOF

Karel Fučík and Ludvík Lábler, Prague, Czechoslovakia, assignors to Spofa, Spojene farmaceuticke zavody, narodni podnik, Prague, Czechoslovakia No Drawing. Application February 4, 1950, Serial No. 142,534. In Czechoslovakia February 14, 1949

2 Claims. (Cl. 260—343.2)

The coumarine derivatives are very precious substances in the pharmaceutical practice as they have remarkable biological properties and it is possible to use them either directly as medicines or as an intermediate in the production of other medicinals. It was established that 3,3'-bis-4-hydroxycoumarinylacetone is one of the most precious coumarine derivatives, which itself has very interesting anticoagulation properties and it is also possible to use said derivative as an intermediate for the manufacture of other important medicines.

The object of the present invention is a method of manufacturing this substance which comprises reacting 4-hydroxycoumarine with isonitrosoacetone according to the following reaction:

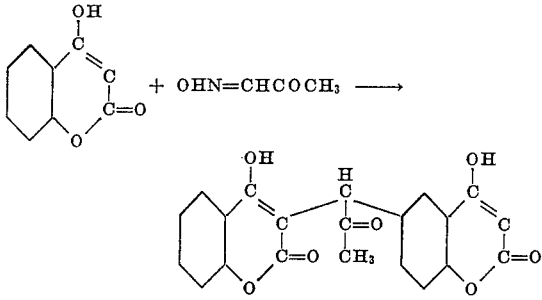

The usual way of producing substances of this type, by condensing 4-hydroxycoumarine with methylglyoxal, does not result in satisfactory yields when operated on a technical scale. Furthermore, methylglyoxal is difficult to procure due to the difficulty of isolating it.

On the contrary, the direct reaction of 4-hydroxycoumarine with isonitrosoacetone not only results in excellent yields but eliminates one step in its production.

Example 11.5 gms. of 4-hydroxycoumarine are dissolved in boiling water. The necessary amount of isonitrosoacetone is added to the boiling solution. After half an hour of boiling, a crystalline substance is separated, which is insoluble in boiling water, has a M. P. of 242° C., and gives a color reaction with $FeCl_3$. It is possible to carry out the crystallization from the acetic acid. The substance can be determined by quantitative titration in the alcoholic solution, by the effect of change in pH on methyl red.

What is claimed by Letters Patent is:

1. 3,3'-bis-4-hydroxycoumarinylacetone.
2. A method of manufacturing 3,3' bis-4 hydroxycoumarinylacetone which comprises reacting 4 hydroxycoumarine with isonitrosoacetone, in the presence of boiling water and recovering 3,3' bis-4 hydroxycoumarinylacetone.

KAREL FUČÍK.
LUDVÍK LÁBLER.

No references cited.